United States Patent
Ansari et al.

(10) Patent No.: US 8,184,627 B2
(45) Date of Patent: *May 22, 2012

(54) POINT-TO-MULTIPOINT (P2MP) NETWORK RESOURCE MANAGEMENT

(75) Inventors: Nirwan Ansari, Montville, NJ (US); Si Yin, Redmond, WA (US)

(73) Assignee: New Jersey Institute of Technology, Newark, NJ (US)

( * ) Notice: Subject to any disclaimer, the term of this patent is extended or adjusted under 35 U.S.C. 154(b) by 198 days.

This patent is subject to a terminal disclaimer.

(21) Appl. No.: 12/396,039

(22) Filed: Mar. 2, 2009

(65) Prior Publication Data

US 2010/0220722 A1     Sep. 2, 2010

(51) Int. Cl.
H04L 12/28    (2006.01)

(52) U.S. Cl. ....................................... 370/389

(58) Field of Classification Search .................. 370/229, 370/235, 241, 389, 351, 249
See application file for complete search history.

(56) References Cited

U.S. PATENT DOCUMENTS

| | | | | |
|---|---|---|---|---|
| 5,784,358 | A * | 7/1998 | Smith et al. | 370/230 |
| 6,633,579 | B1 * | 10/2003 | Tedijanto et al. | 370/432 |
| 6,937,678 | B2 * | 8/2005 | Abel | 375/350 |
| 7,483,374 | B2 * | 1/2009 | Nilakantan et al. | 370/235 |
| 7,724,636 | B2 * | 5/2010 | Tseng et al. | 369/124.1 |
| 7,808,913 | B2 | 10/2010 | Ansari et al. | |
| 7,948,881 | B2 | 5/2011 | Alharbi et al. | |
| 7,969,881 | B2 | 6/2011 | Ansari et al. | |
| 2006/0250986 | A1 | 11/2006 | Alharbi et al. | |
| 2007/0268828 | A1 * | 11/2007 | Peng | 370/235 |
| 2009/0143872 | A1 * | 6/2009 | Thiele et al. | 700/30 |

OTHER PUBLICATIONS

Office action issued Feb. 16, 2011 in U.S. Appl. No. 12/418,681, filed Apr. 6, 2009.
Kramer, et al, Ethernet PON (ePON): Design and Analysis of an Optical Access Network, Photonic Network Communications, 2001, pp. 307-319, 3:3, Kluwer Academic Publishers, The Netherlands, Dec. 2000.
Kramer, et al., IPACT: A Dynamic Protocol for an Ethernet PON (EPON), IEEE Communications Magazine, 2002, pp. 74-80, vol. 40, No. 2, www.ieee.org, NYC, NY, USA, Feb. 2002.
Sherif, et al., A Novel Decentralized Ethernet-Based PON Access Architecture for Provisioning Differentiated QoS, Journal of Lightwave Technology, 2004, pp. 2483-2497, vol. 22, No. 11, IEEE XPlore, NYC, NY, USA, Nov. 2004.
Banerjee, et al., Fair Sharing Dual Service-Level Agreements to Achieve Open Access in a Passive Optical Network, IEEE Journal on Selected Areas in Communications, 2006, pp. 32-44, vol. 24, No. 8, NYC, NY, USA, Aug. 2006.

(Continued)

Primary Examiner — Kwang B Yao
Assistant Examiner — Anh Ngoc Nguyen
(74) Attorney, Agent, or Firm — Baker & Hostetler LLP

(57) ABSTRACT

Techniques for managing resources in a point-to-multipoint (P2MP) network are disclosed. In some examples, a root station is adapted to transmit and receive network packets and leaf stations are adapted to transmit and receive the network packets from the root station. An electrical control system can be adapted to reduce an amount of time for the electrical control system to produce a steady state output and to define a maximum boundary for the output. The electrical control system may include feedback to control the root station based, at least in part, on the output of the electrical control system.

20 Claims, 8 Drawing Sheets

OTHER PUBLICATIONS

Byun, et al, Dynamic bandwidth allocation algorithm in ethernet passive optical networks, IEEE Electronic Letters, 2003, pp. 1001-1002, vol. 39., No. 13, IEEE Xplore, NYC, NY, USA, Jun. 2003.

Luo, et al., Limited Sharing with traffic prediction for dynamic bandwidth allocation and QoS provisioning over ethernet passive optical networks, Journal of Optical Networking, 2005, pp. 561-572, vol. 4, No. 9, Optical Society of America, USA, Jul. 2005.

Assi, et al., Dynamic Bandwidth Allocation for Quality-of-Service Over Ethernet PONs, IEEE Journal on Selected Areas in Communications, 2003, pp. 1467-1477, vol. 21, No. 9, NYC, NY, USA, Nov. 2003.

Naser, et al., A Joint-ONU Interval-Based Dynamic Scheduling Algorithm for Ethernet Passive Optical Networks, IEEE/ACM Transactions on Networking, 2006, pp. 889-899, vol. 14, No. 4, IEEE Xplore, NYC, NY, USA, Aug. 2006.

Kim, et al., Optimal rate based flow control for ABR services in ATM Networks, 1999 IEEE TENCON, 1999, pp. 773-776, vol. 1, Korea, Sep. 1999.

Shami, et al., Jitter Performance in Ethernet Passive Optical Networks, Journal of Lightwave Technology, 2005, pp. 1745-1753, vol. 23, No. 4, IEEE Xplore, NYC, NY, USA, Apr. 2005.

IEEE Computer Society, Part 3: Carrier Sense Multiple Access with Collision Detection (CSMA/CD) Access Method and Physical Layer Specifications, IEEE-SA Standards Board, 2004, IEEE Std. 802.3ah, Amendment to IEEE Std. 802.2 TM-2002, as amended by IEEE Stds 802.3ae TM,-2002, 802.3aj TM-2003 and 802.3ak-2004, Sep. 2004.

International Telecommunication Union, Broadband optical access systems based on Passive Optical Networks (PON), Series G: Transmission Systems and Media, Digital Systems and Networks 2005 ITU-T Recommendation G.983.1, Jan. 2005.

International Telecommunication Union, Gigabite-capable passive optical networks (PON), Series G: Transmission Systems and Media, Digital Systems and Networks, 2003, ITU-T Recommendation G.984.1, Mar. 2008.

Luo, et al., Bandwidth allocation for multiservice access on EPONs, IEEE Optical Communications, 2005, pp. S16-S21, vol. 43, No. 2, IEEE, NYC, NY, USA, Feb. 2005.

MPCP—State of the Art—PDF Presentation, (2002), http:wwwieee802.org/3/efm/public/jan02/maislos_1_0102.pdf, Jan. 2002.

Yin, et al., Stability of Predictor Based Dynamic Bandwidth Allocation over EPONs, IEEE Communications Letters, 2007, pp. 549-551, vol. 11, No. 6, IEEE, NYC, NY, USA, Jun. 2007.

Willinger, et al., Self-Similarity Through High-Variability: Statistical Analysis of Ethernet LAN Traffic at the Source Level, IEEE/ACM Transactions on Networking, 1997, pp. 71-86, vol. 5, No. 1, IEEE, NYC, NY, USA, Feb. 1997.

Yin, et al., Bandwidth Allocation over EPONs: A Controllability Perspective, Proc. IEEE GLOBCOM 2006, 2006, San Francisco, CA, USA, Nov. 2006.

Banerjee, et al., Wavelength-division-multiplexed passive optical network (WDM-POM) technologies for broadband access: a review [Invited], Journal of Optical Networking, 2005, pp. 737-758, vol. 4, No. 11, Optical Society of America, USA, Nov. 2005.

Luo, et al., Resource Management for Broadband Access over Time-Division Multiplexed Passive Optical Networks, IEEE Network Magazine, 2007, pp. 20-27, vol. 21, Issue 5, IEEE, NYC, NY, USA, Sep. 2007.

Zhang, et al., Dual DEB-GPS scheduler for delay-constraint applications in Ethernet passive optical networks, IEICE Transactions on Communications, May 2003, pp. 1575-1584, vol. E86-B. No. 5, Joint Special Issue on Recent Progress in Optoelectronics and Communications, USA.

Hellerstein, et al., Feedback Control of Computing Systems, 2004, ch. 10, pp. 337-373, Wiley-Interscience, Hoboken, NJ, USA. [Month of publication is unknown. The year of publication is sufficiently earlier than the effective U.S. filing date and any foreign priority date so the particular month of publication is not in issue.].

Bubnicki, Modem Control Theory, 2005, pp. 55-60, Spring Berlin Heidelberg, New York, USA. [Month of publication is unknown. The year of publication is sufficiently earlier than the effective U.S. filing date and any foreign priority date so the particular month of publication is not in issue.].

Jury, Inners and Stability of Dynamic Systems, 2nd Ed., 1982, pp. 264-270, Krieger, Malabar, FA. [Month of publication is unknown. The year of publication is sufficiently earlier than the effective U.S. filing date and any foreign priority date so the particular month of publication is not in issue.].

Chen, DT Space-Space Equations and Realizations, Signals and Systems, 2004, pp. 380.389, Oxford University Press, New York, USA. [Month of publication is unknown. The year of publication is sufficiently earlier than the effective U.S. filing date and any foreign priority date so the particular month of publication is not in issue.].

N. Ansari and Y. Luo, "Passive Optical Networks for Broadband Access," The Handbook of Computer Networks Volume 1: Data Transmission and Digital and Optical Networks (Hossein Ridgoli, ed.), pp. 948-957, John Wiley & Son, ISBN 978-0-471-78458-6, 2008, USA. [Month of publication is unknown. The year of publication is sufficiently earlier than the effective U.S. filing date and any foreign priority date so the particular month of publication is not in issue.].

Ma, et al., A Bandwidth Guaranteed Polling MAC Protocol for Ethernet Passive Optical Networks, Proc. IEEE INFOCOM, 2003, pp. 22-31, San Francisco, CA, USA. [Month of publication is unknown. The year of publication is sufficiently earlier than the effective U.S. filing date and any foreign priority date so the particular month of publication is not in issue.].

Hollot, et al., A Control of Theoretic Analysis of RED, Proc. of IEEE INFOCOM 2001, 2001, pp. 1510-1519, vol. 3, Anchorage, AK, USA. [Month of publication is unknown. The year of publication is sufficiently earlier than the effective U.S. filing date and any foreign priority date so the particular month of publication is not in issue.].

* cited by examiner adapting a control for an electrical control system based at least in part on
the equation,
$$U_i(n) = -KX_i(n)$$
where $K = K_i|_{i=1\sim4}$, and where $X_i(n)$ is a state vector that indicates a
bandwidth requirement and a queue length of at least one leaf station,
wherein the electrical control system includes a variable gain for an output,
wherein the output has a steady state and a defined maximum boundary ← 34

↓ repeatedly analyzing the output of the electrical control system to determine
if the output is equal to a desired output ← 36

↓ dynamically adjusting the output of the electrical control system to provide a
new output by changing a variable gain until the new output achieves the
desired output ← 38

↓ transmitting one or more network packets to one or more of the at least one
leaf station and at least one root station based at least in part on the output
of the electrical control system ← 40 wherein the variable gain is $K_i$, a constant matrix and is defined by the
equation
$$\begin{cases} f_1(k_{11},k_{12},k_{21},k_{22},\alpha_i) = -2e^{-4/T_i}\cos(\pi\frac{\log r}{\log M_i}) \\ f_2(k_{11},k_{12},k_{21},k_{22},\alpha_i) = e^{-2/T_i} \end{cases}$$
← 42 where $k_{11}, k_{12}, k_{21}$ and $k_{22}$ are vectors of $K_i$, $\alpha$ is an estimate index, $r$ is a
reference input, $T_i$ is the amount of time for the electrical control system to
produce an output comprising a steady state, and $M_i$ is the maximum
boundary for the output

FIG. 3 adapting a control for an electrical control system based at least in part on the equation,
$$U_i(n) = -KX_i(n)$$
where $K = K_i|_{i=1\sim 4}$, and where $X_i(n)$ is a state vector that indicates a bandwidth requirement and a queue length of at least one leaf station, wherein the electrical control system includes a variable gain for an output, wherein the output has a steady state and a defined maximum boundary ◄──── 44 repeatedly analyzing the output of the electrical control system to determine if the output is equal to a desired output ◄──── 46 dynamically adjusting the output of the electrical control system to provide a new output by changing a variable gain until the new output achieves the desired output ◄──── 48 transmitting one or more network packets to one or more of the at least one leaf station and at least one root station based at least in part on the output of the electrical control system ◄──── 50 wherein the variable gain is $K_i$ a constant matrix and is defined by the equation
$$\begin{cases} f_1(k_1,k_2) = -2e^{-4/T_i}\cos(\pi\frac{\log r}{\log M_i}) \\ f_2(k_1,k_2) = e^{-2/T_i} \end{cases}$$
◄──── 52 where $k_1$ and $k_2$ are vectors of $K_i$, $r$ is a reference input, $T_i$ is the amount of time for the electrical control system to produce an output comprising a steady state, and $M_i$ is the maximum boundary for the output.

POINT-TO-MULTIPOINT (P2MP) NETWORK RESOURCE MANAGEMENT

BACKGROUND

Point to multipoint (P2MP) topology is one of the most commonly used topologies in an access network. In general, P2MP may include a root station (RS) and a number of leaf stations (LSs). In P2MP, any media having a RS that broadcasts packets through a single trunk (such as a frequency, wavelength, or wireless channel) to LSs typically may be referred to as downstream. Similarly, LSs unicasting packets through branches and the trunk to the RS may be referred to as upstream. In addition, the LSs may not communicate with each other in a peer-to-peer manner.

Many wired broadband access networks such as the Time Division Multiplex (TDM) Passive Optical Network (PON) (which includes Ethernet passive optical networks (EPONs), Gigabit passive optical networks (GPONs), and Broadband passive optical networks (BPONs)) can be generalized into a P2MP architecture. The P2MP architecture of PONs may reduce the dominant deployment and maintenance cost, and facilitates the central management by utilizing the RS as the central office.

In the recent past, there have been attempts to address upstream resource management and allocation mechanism issues in P2MP networks, especially in P2MP EPON networks. These schemes may be categorized into three categories: fixed resource allocation (FRA), request-based resource allocation (RRA), and prediction-based resource allocation (PRA). Although most of the schemes address the resource management in EPONs, they can be generalized to other P2MP networks by employing appropriate MAC control cells and fields in the frames.

Although attempts have been made to address the upstream resource management issue in P2MP networks, few attempts have addressed the above different resource management schemes such that these schemes can be evaluated, compared and further improved.

Furthermore, current upstream resource allocation schemes in P2MP networks may have difficulties reaching transient performance objectives such as minimum settling time and maximum overshoot, due to the complexity of mapping the objectives into the corresponding scheduling algorithm and resource management schemes.

BRIEF DESCRIPTION OF THE SEVERAL VIEWS OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 is a flowchart showing the operation of another example embodiment;

FIG. 4 is a flowchart showing the operation of yet another example embodiment;

DETAILED DESCRIPTION

Figure 1:
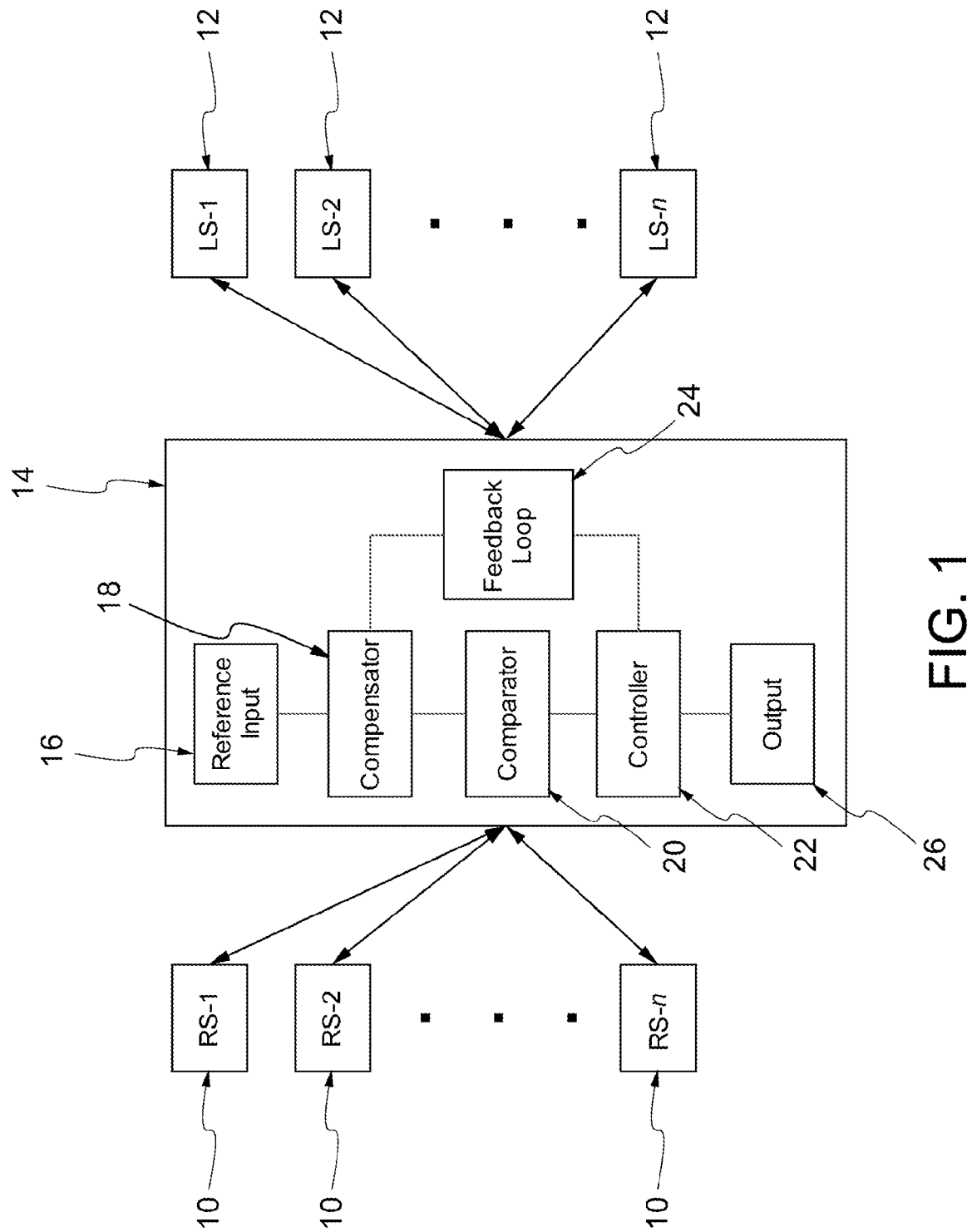
FIG. 1 is a diagram of a general P2MP architecture.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods and systems related to systems and methods for efficient resource management in P2MP networks.

FIG. 1 is a diagram of a general point-to-multipoint (P2MP) architecture arranged in accordance with the present disclosure. As shown in FIG. 1, a P2MP network resource management system may include at least one root station 10 (identified in FIG. 1 as RS-1, RS-2 and RS-n, where n may be any numeral) adapted to transmit and receive network packets, at least one leaf station 12 (identified in FIG. 1 as LS-1, LS-2 and LS-n, where n may be any numeral) may be adapted to transmit and receive network packets from the at least one root station 10, and a resource management component 14 may be adapted to manage network packet transmission. Each leaf station 12 is in communication with the root station(s) 10.

The resource management component 14 may include a reference input signal 16, a compensator 18, a comparator 20, a controller 22, and a feedback loop 24. The compensator 18 may be operably coupled to the reference input signal 16. The compensator 18 may be adapted to offset a control error (which may be the difference between the reference input signal 16 and an output signal 26, for example). The comparator 20 may be adapted to calculate the control error and may be operably connected to the compensator 18. The comparator 20 may be an apparatus and/or circuitry capable of comparing two values (e.g., reference input signal 16 and output signal 26) and providing an output (to the controller 22, for example) depending on the comparison. The controller 22 may be adapted to output the output signal 26. Further, the controller 22 may be adapted to manipulate the output signal 26 if the control error is determined to be a non-zero value. The feedback loop 24 may be operably coupled to the controller 22 and the comparator 20. Further, the feedback loop 24 may include a controller gain (which may be multiplied by or otherwise combined with the output signal 26).

In some example embodiments, the controller 22 may be configured to adjust the controller gain to manipulate the output signal 26 such that specific characteristics of the output signal 26 may be attained. Design objectives for resource allocation in a P2MP system may include system robustness, accuracy, and target transient performance. These objectives (and others) may be achieved through proper design of the controller 22, as discussed below.

Figure 2:
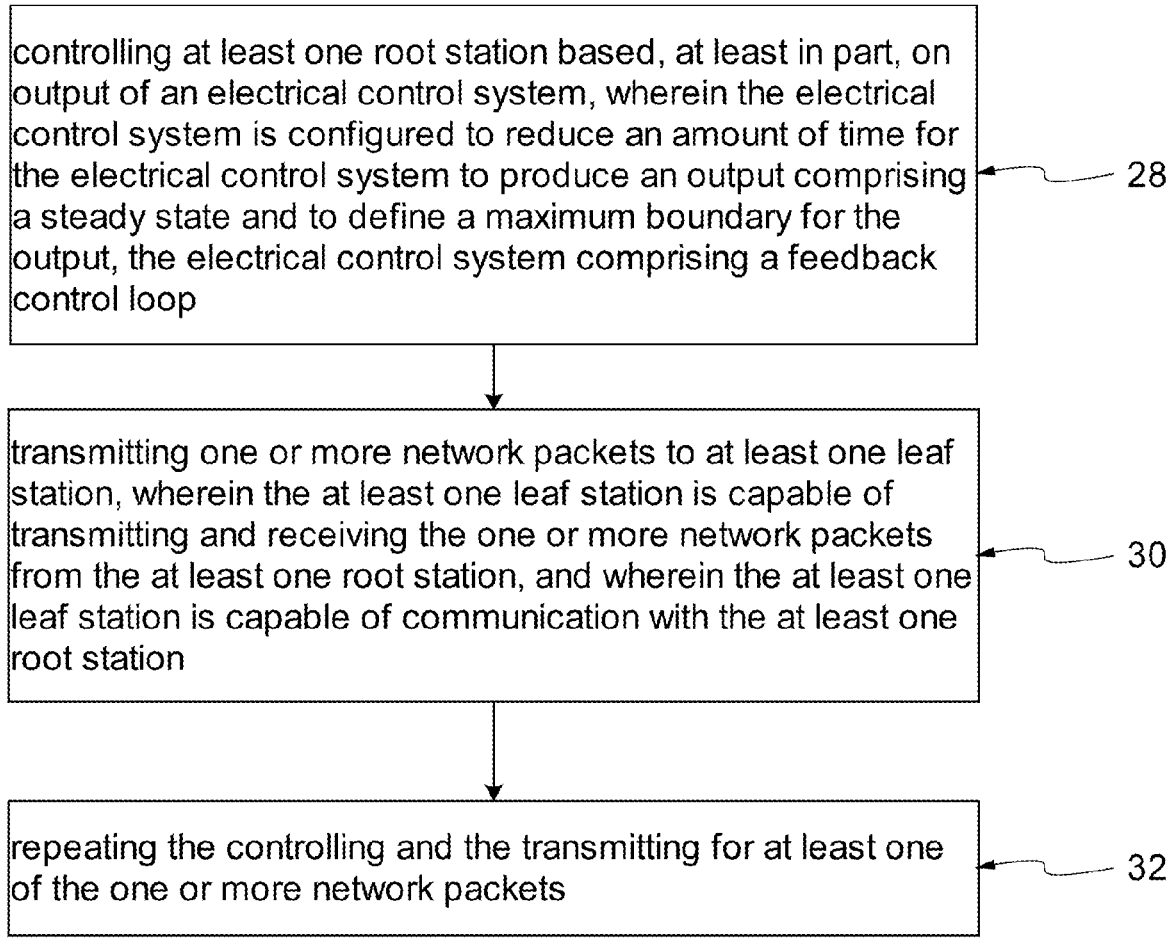
FIG. 2 is a flowchart showing the operation of an example embodiment.

Some additional example embodiments may include a method for an electrical control system to manage resources in a point-to-multipoint (P2MP) network that includes at least one root station and at least one leaf station each adapted to transmit and receive one or more network packets over the P2MP network, which may operate as depicted in FIG. 2. The illustrated example includes processing operations 28, 30 and 32. Operation 28 includes controlling the at least one root station based, at least in part, on output of the electrical control system, where the electrical control system is configured to reduce an amount of time for the electrical control system to produce an output comprising a steady state and to define a maximum boundary for the output. The electrical control system comprises a feedback control loop. Operation 30 includes transmitting one or more network packets to the at least one leaf station, where the at least one leaf station is capable of transmitting and receiving the one or more network packets from the at least one root station, and where the at least one leaf station is capable of communication with the at least one root station. Operation 32 includes repeating the controlling and the transmitting for at least one of the one or more network packets.

In some example embodiments, a point-to-multipoint (P2MP) network architecture may be configured to implement the method of FIG. 2. In one example embodiment, the P2MP network architecture may be the RRA scheme.

Additional example embodiments include a method for an electrical control system to manage resources in a point-to-multipoint (P2MP) network that includes at least one root station and at least one leaf station that are adapted to transmit and receive one or more network packets over the P2MP network, and operates as depicted in FIG. 3. The illustrated example may include processing operations 34, 36, 38, 40 and 42. Operation 34 includes adapting a control for the electrical control system based at least in part on the equation $U_i(n)=-KX_i(n)$, where $K=K_i|_{i=1\sim4}$, and where $X_i(n)$ is a state vector that indicates a bandwidth requirement and a queue length of the at least one leaf station, where the electrical control system includes a variable gain for an output, where the output has a steady state and a defined maximum boundary. Operation 36 includes repeatedly analyzing the output of the electrical control system to determine if the output is equal to a desired output. Operation 38 includes dynamically adjusting the output of the electrical control system to provide a new output by changing a variable gain until the new output achieves the desired output. Operation 40 includes transmitting one or more network packets to one or more of the at least one leaf station and at least one root station based at least in part on the output of the electrical control system. As shown in 42, the variable gain is $K_i$, a constant matrix and is defined by the equation $$\begin{cases} f_1(k_{11}, k_{12}, k_{21}, k_{22}, \alpha_i) = -2e^{-\frac{4}{T_i}}\cos\left(\pi\frac{\log r}{\log M_i}\right), \\ f_2(k_{11}, k_{12}, k_{21}, k_{22}, \alpha_i) = e^{-\frac{2}{T_i}} \end{cases}$$

where $k_{11}$, $k_{12}$, $k_{21}$ and $k_{22}$ are vectors of $K_i$, $\alpha_i$ is an estimate index, r is a reference input, $T_i$ is the amount of time for the electrical control system to produce an output comprising a steady state, and $M_i$ is the maximum boundary for the output.

In some example embodiments, a point-to-multipoint network (P2MP) architecture may be configured to implement the method of FIG. 3. In one example, such a P2MP network architecture may implement the PRA scheme.

Additional example embodiments include a method for an electrical control system to manage resources in a point-to-multipoint (P2MP) network that includes at least one root station and at least one leaf station that are adapted to transmit and receive one or more network packets over the P2MP network, and operates as depicted in FIG. 4. The illustrated example may include processing operations 44, 46, 48, 50 and 52. Operation 34 includes adapting a control for the electrical control system based at least in part on the equation $U_i(n)=-KX_i(n)$, where $K=K_i|_{i=1\sim4}$, and where $X_i(n)$ is a state vector that indicates a bandwidth requirement and a queue length of the at least one leaf station, where the electrical control system includes a variable gain for an output, where the output has a steady state and a defined maximum boundary. Operation 36 includes repeatedly analyzing the output of the electrical control system to determine if the output is equal to a desired output. Operation 38 includes dynamically adjusting the output of the electrical control system to provide a new output by changing a variable gain until the new output achieves the desired output. Operation 40 includes transmitting one or more network packets to one or more of the at least one leaf station and at least one root station based at least in part on the output of the electrical control system. As shown at 52, the variable gain is $K_i$, a constant matrix and is defined by the equation $$\begin{cases} f_1(k_1, k_2) = -2e^{-\frac{4}{T_i}}\cos\left(\pi\frac{\log r}{\log M_i}\right), \\ f_2(k_1, k_2) = e^{-\frac{2}{T_i}} \end{cases}$$

where $k_1$ and $k_2$ are vectors of $K_i$, r is a reference input, $T_i$ is the amount of time for the electrical control system to produce an output having a steady state, and $M_i$ is the maximum boundary for the output.

In some example embodiments, a point-to-multipoint (P2MP) network architecture may be configured to implement the method of FIG. 4. In one example, such a P2MP network architecture may implement the RRA scheme.

Figure 5:
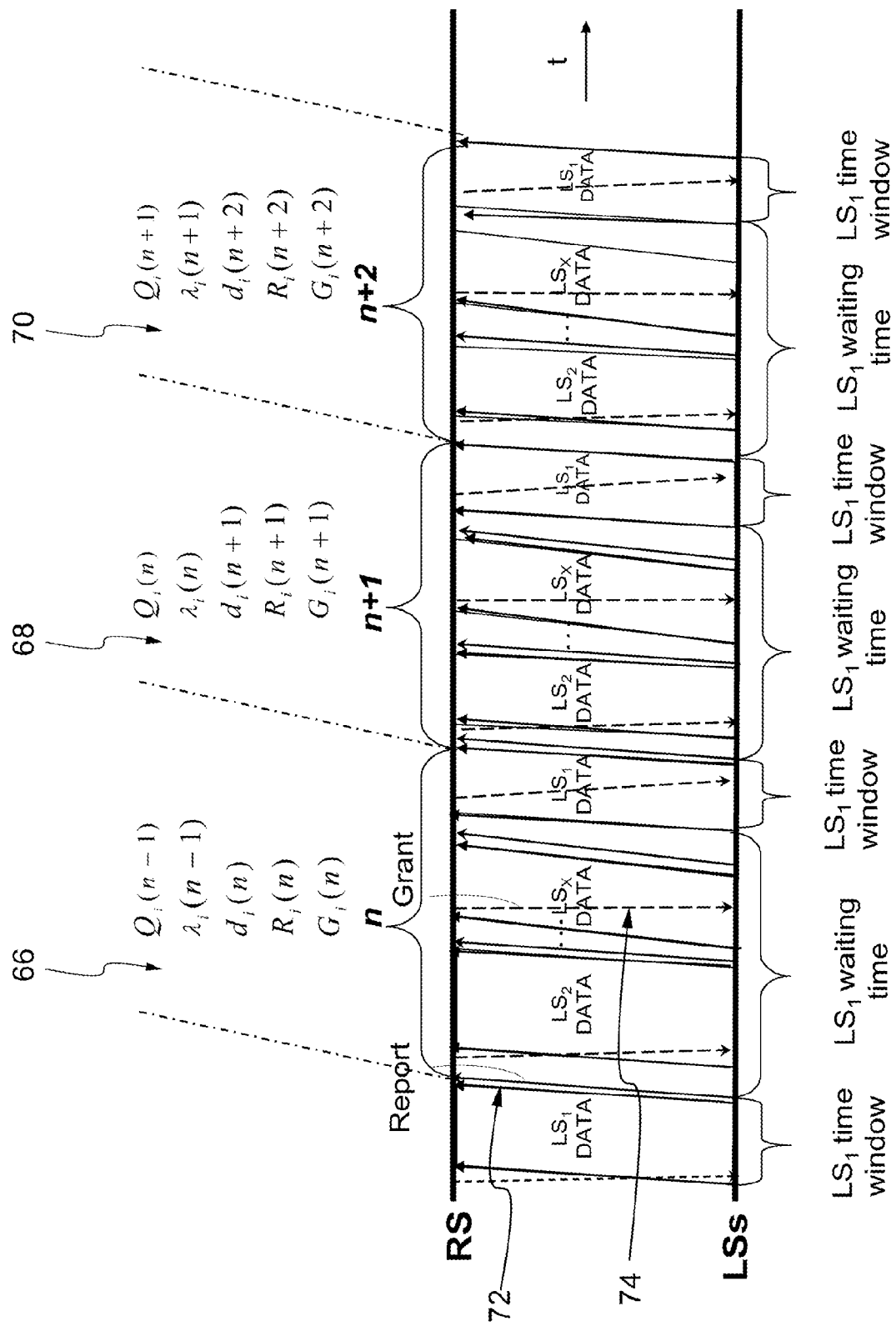
FIG. 5 is a diagram depicting service cycles over time in an example embodiment of a P2MP architecture.

The present disclosure now considers a P2MP system with one RS and y LSs, as depicted in FIG. 5. The RS serves each LS once in a service cycle 66, 68, 70. As previously discussed, the present disclosure contemplates that an issue with P2MP networks may include the upstream resource management and allocation mechanism. The upstream resource could be bandwidth (TDM-PON), wavelength (wavelength-division multiplexing or WDM-PON), or frequency (orthogonal frequency-division multiplexing or OFDM). Under the P2MP architecture, multiple LSs may share an upstream trunk, and each LS may have no knowledge of the transmission condition of the other LSs. To avoid data collision, a request/grant arbitrary mechanism, such as the multipoint control protocol (MPCP) in an EPON, typically may be deployed for upstream resource sharing. The request/grant mechanism may be implemented in continuous service cycles 66, 68, 70. In each service cycle 66, 68, 70, LSs send requests 72 to RS for a resource grant 74 before any transmission may occur. Thereafter, RS may determine an appropriate transmission window in the next service cycle 68, 70 to each LS, by considering the requests 72 as well as the available resources, and may send out grants 74 to LSs. Finally, after receiving the grants 74, LSs may begin to transmit their packets until their granted window has passed. In this manner, a dynamic resource allocation may be achieved.

As used herein, the following notations shall be adopted.

$Q_i(n)$: the reported residual queued length from $LS_i$ ($1 \leq l \leq y$) at the end of service cycle n 66;

$R_i(n)$: the resource request 72 of $LS_i$ for service cycle n 66 ($R_i(n)$ may or may not be the same as $Q_i(n)$, depending on the particular resource allocation scheme as described below);

$\lambda_i(n)$: the actual arrived data of $LS_i$ at service cycle n+1 68;

$\hat{\lambda}_i(n)$: the predicted arrival data at $LS_i$ in service cycle n+1 68;

$d_i(n)$: the departed data from $LS_i$ at service cycle n 66;

$G_i(n)$: the allocated timeslot to $LS_i$ at service cycle n 66;

$G_i^{max}$: the maximum timeslot length prescribed by the service level agreement (SLA).

Since no queue status report may be conducted in the FRA scheme, and the reported queue length may equal zero, e.g., $$Q_i(n+1)=0 \quad \text{(Eq. 1a)}$$

for FRA.

In some RRA schemes, the reported queue length of transmission cycle (n+1) 68 may be determined by the difference of the injected data, which may include the transmission residual of cycle n 66 (e.g., $Q_i(n)$) as well as the incoming data arrived in the waiting time at $ONU_i$ in transmission cycle n 66 (e.g., $\lambda_i(n)$), and the delivered data (e.g., $d_i(n)$), e.g., $$Q_i(n+1)=Q_i(n)+\lambda_i(n)-d_i(n+1) \quad \text{(Eq. 1b)}$$

In the PRA scheme, "over-grant" may occur. This "over-grant" may be adjusted by reporting the difference between the injected data (e.g., $Q_i(n)+\lambda_i(n)$) and the grant $G_i(n)$ 74, e.g., $$Q_i(n+1)=Q_i(n)+\lambda_i(n)-G_i(n+1) \quad \text{(Eq. 1c)}$$

Eqs. 1a-1c may be summarized as $$Q_i(n+1) = \begin{cases} 0, & \text{for } FRA \\ Q_i(n)+\lambda_i(n)-d_i(n+1), & \text{for } RRA \\ Q_i(n)+\lambda_i(n)-G_i(n+1), & \text{for } PRA \end{cases} \quad \text{(Eq. 1)}$$

On the other hand, the resource request $R_i(n)$ 72 of $LS_i$ for service cycle n 66 may be determined by perspective resource allocation schemes. For FRA, the resource request of $LS_i$ in service cycle (n+1) 68 (e.g., $R_i(n+1)$) is the fixed value $R_{fix}$, e.g., $$R_i(n+1)=R_{fix} \quad \text{(Eq. 2a)}$$

In RRA, $R_i(n+1)$ may be determined by the reported queue length, e.g., $$R_i(n+1)=Q_i(n), \quad \text{(Eq. 2b)}$$

When a traffic predictor is employed, as in PRA, $R_i(n+1)$ may be determined by the sum of the reported queue length and the predicted arrival data, e.g., $$R_i(n+1)=Q_i(n)+\hat{\lambda}_i(n) \quad \text{(Eq. 2c)}$$

where $\hat{\lambda}_i(n)$ is the predicted arrival data at $LS_i$ in service cycle (n+1) 68. Eq. 2a-2c may be summarized as $$R_i(n+1) = \begin{cases} R_{fix}, & \text{for } FRA \\ Q_i(n), & \text{for } RRA \\ Q_i(n)+\hat{\lambda}_i(n), & \text{for } PRA \end{cases} \quad \text{(Eq. 2)}$$

After processing the request 72, the RS allocates time windows $G_i(n+1)$ to $LS_i$. In FRA, the assigned resource to $LS_i$ in transmission cycle n+1 68 (e.g., $G_i(n+1)$) may be the fixed value $R_{fix}$. In both RRA and PRA, $G_i(n+1)$ may be the smaller value of the bandwidth request (e.g., $R_i(n+1)$) and the SLA parameter (e.g., $G_i^{max}$), e.g., $$G_i(n+1) = \begin{cases} R_{fix}, & \text{for } FRA \\ \min[R_i(n+1), G_i^{max}], & \text{for } RRA \\ \min[R_i(n+1), G_i^{max}], & \text{for } PRA \end{cases} \quad \text{(Eq. 3)}$$

After receiving the bandwidth allocation decision, $LS_i$ may schedule its upstream transmission indicated by $G_i(n+1)$, and the delivered data $d_i(n+1)$ may be described as $$d_i(n+1)=\min\{G_i(n+1),Q_i(n)+\lambda_i(n)\} \quad \text{(Eq. 4)}.$$

The present disclosure considers that a unified state space model may be constructed for FRA, RRA, and PRA based at least in part on Eqs. 1 and 2, as follows $$X_i(n+1)=AX_i(n)+BU_i(n), \quad \text{(Eq. 5)}$$

where $X_i(n)=[R_i(n)\ Q_i(n)]^T$ may be the state vector, indicating the bandwidth requirement and the queue length of $LS_i$, and $U_i(n)$ may be the input vector, representing the arrived data during the waiting time and the SLA parameter. A and B may be the matrices for the state vector and input vector, respectively, that may determine intrinsic characteristics of each scheme at the system level.

Therefore, a unified model for upstream resource allocation over a P2MP system may be established through the state space equation (Eq. 5), with Eqs. 3 and 4 being performance constraints. The model essentially exhibits the relationship between the input (e.g., on-line network traffic load), output (e.g., bandwidth allocation decision), and state variables (e.g., queue length and resource requirement). The state space representation may provide a convenient and compact way to model and analyze various resource allocation schemes for the P2MP system from the control theory point of view. In this way, a specific resource allocation scheme may essentially define its particular coefficient matrices A and B to assign the upstream resource in a different way.

The present disclosure contemplates that, traditionally, the above control objectives may have been difficult to solve in P2MP systems because of the complexity of mapping the objectives into the corresponding scheduling algorithm and resource management schemes. However, the example state space model described herein may give a simple and straightforward framework to achieve such objectives by using state space feedback control techniques.

In some example embodiments, the settling time $T_i$ and the maximum overshoot $M_i$ may be two central parameters for the transient performance. The settling time $T_i$ may be defined as the time for the P2MP system to reach the steady state. Short settling times may be utilized to achieve the performance objective, especially when the incoming traffics of LSs have large volatility. In such case, short settling time may ensure the system converges to the stable state before the traffic load changes. On the other side, the maximum overshoot $M_i$ may be defined as the difference between the maximum system output $y_{max}$ and steady-state system output $y_{ss}$ divided by the steady-state system output $y_{ss}$, e.g., $$M_i = \frac{y_{max} - y_{ss}}{y_{ss}} \quad \text{(Eq. 6)}$$

The maximum overshoot may give the upper bound for the output oscillations of a P2MP system. For example, the specifications of a P2MP system may call for the system to reach a stable state within 10 seconds, and the overshoot should be less than 5%.

Figure 6:
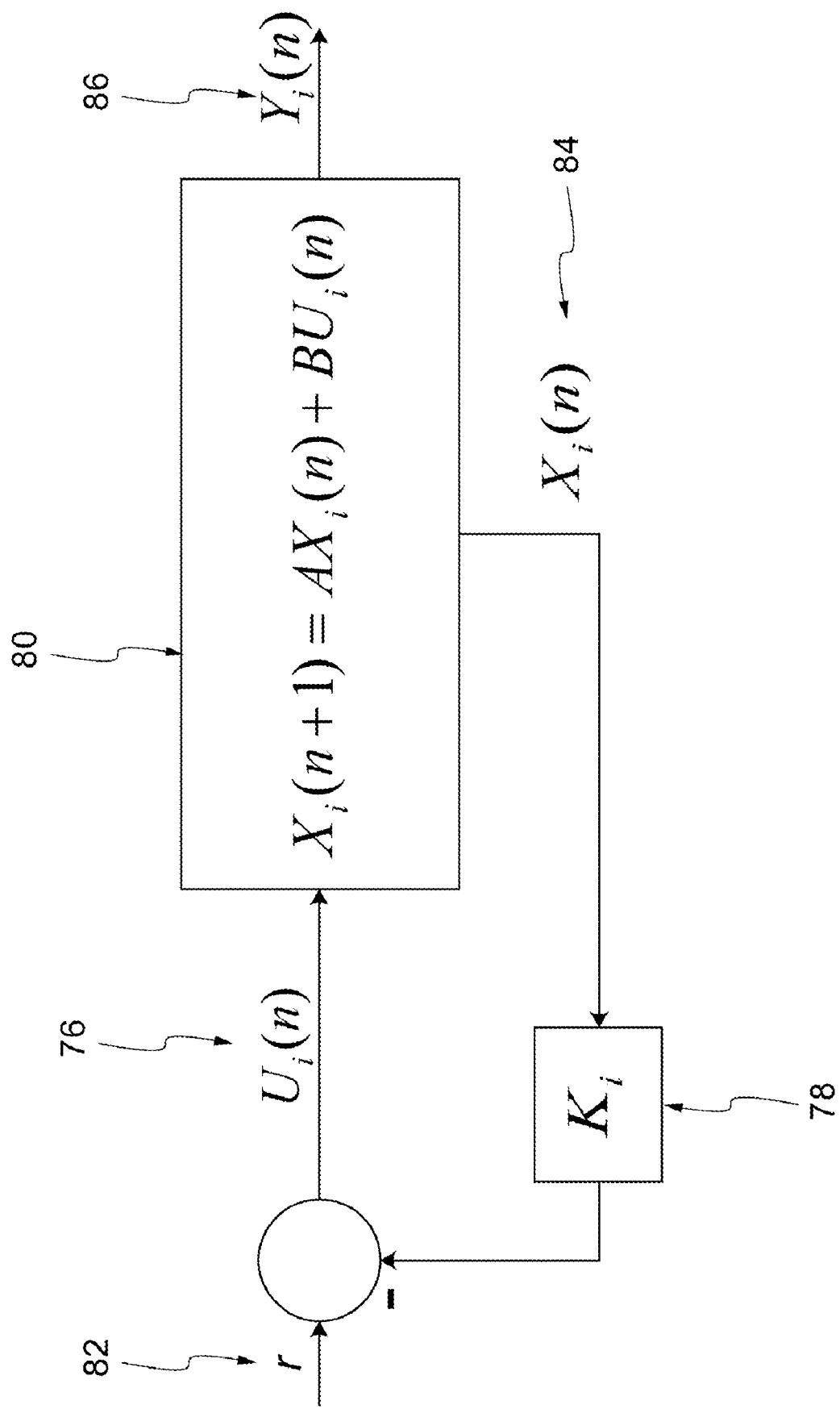
FIG. 6 is a schematic diagram of an example embodiment of an electrical control system.

In some embodiments, for resource allocation schemes that may be based at least in part on the state space model (e.g., Eq. (5)), there may exist a controller, $u_i(n)$ 76, such that $$u_i(n) = -K_i x_i(n), \quad \text{(Eq. 7)}$$

to drive the system into a close-loop form, as long as the system is controllable; this is known as pole placement. Substituting Eq. 7 into Eq. 5 yields, $$x_i(n+1) = (A_i - B_i K_i) x_i(n). \quad \text{(Eq. 8)}$$

which is the close-loop form for Eq. 5, where $K_i$ 78 may be a constant matrix. The controller design in this embodiment is illustrated in FIG. 6.

The present disclosure contemplates that, from the control point of view, the settling time and maximum overshoot may be determined by the closed loop poles. Further, the controller gain $K_i$ 78 in Eq. 8 may essentially determine the poles in the closed loop characteristic polynomial $\det[zI-(A_i-B_iK_i)]$. Thus, the target transient performance $T_i$ and $M_i$ may be achieved by properly tuning the controller gain $K_i$ 78.

Now, the present disclosure considers that the poles of a second order P2MP system are a pair of complex conjugates $re^{\pm j\theta}$. According to control theory, the relationship between the pole parameters r and θ, and the settling time $T_i$ and the maximum overshoot $M_i$ may be stated as $$r \approx e^{-4/T_i} \quad \text{(Eq. 9a)}$$

$$\theta \approx \pi \frac{\log r}{\log M_i} \quad \text{(Eq. 9b)}$$

The eigenvalues of the closed-form characteristic polynomial $\det[zI-(A_i-B_iK_i)]$ may be $re^{\pm j\theta}$, or simply, $\det[zI-(A_i-B_iK_i)] = (z-re^{j\theta})(z-re^{-j\theta})$, e.g., $$\det[zI-(A_i-B_iK_i)] = z^2 - 2r\cos\theta z + r^2 \quad \text{(Eq. 10)}$$

On the other hand, the present disclosure considers that the second order closed-form characteristic polynomial for the PRA scheme may be based at least in part on, $$\det[zI-(A_i-B_iK_i)] = z^2 + f_1(k_{11},k_{12},k_{21},k_{22},\alpha_i)z + f_2(k_{11},k_{12},k_{21},k_{22},\alpha_i) \quad \text{(Eq. 11)}$$

where $k_{11}, k_{12}, k_{21}$, and $k_{22}$ are vectors of $K_i$, and $\alpha_i$ is the estimate index.

As Eqs. 10 and 11 represent the same closed-form characteristic polynomial for PRA, they have the same coefficients for each order of z. Thus, $$\begin{cases} f_1(k_{11}, k_{12}, k_{21}, k_{22}, \alpha_i) = -2r\cos\theta \\ f_2(k_{11}, k_{12}, k_{21}, k_{22}, \alpha_i) = r^2 \end{cases} \quad \text{(Eq. 12)}$$

By substituting Eqs. 9a and 9b into Eq. 12, the result is $$\begin{cases} f_1(k_{11}, k_{12}, k_{21}, k_{22}, \alpha_i) = -2e^{-\frac{4}{T_i}}\cos\left(\pi\frac{\log r}{\log M_i}\right) \\ f_2(k_{11}, k_{12}, k_{21}, k_{22}, \alpha_i) = e^{-\frac{2}{T_i}} \end{cases} \quad \text{(Eq. 13)}$$

Eq. 13 provides the range of each vector of the controller gain $K_i$ 78 to reach the target settling time and maximum overshoot. The solutions of Eq. 13 also show relationships between each vector of the control gain matrix 78 and the estimate index. Although the exact value of each vector and estimate index is not given, Eq. 13 may essentially provide a guideline to design a suitable controller gain $K_i$ 78 such that the target settling time $T_i$ and maximum overshoot $M_i$ in the PRA scheme may be met. It is also noted that the estimate index $\alpha_i$ may have an impact on achieving the called for transient performance.

Similarly, the characteristic polynomial for the RRA scheme may be $$\det[zI-(A_i-B_iK_i)] = z^2 + f_1(k_1,k_2)z + f_2(k_1,k_2) \quad \text{(Eq. 14)}$$

where $k_1$ and $k_2$ are vectors of $K_i$ 78.

Since Eqs. 10 and 14 represent the same or similar closed-form characteristic polynomial for RRA, they may have the same or similar coefficients for each order of z. Comparing the coefficients of Eqs. 10 and 14 yields $$\begin{cases} f_1(k_1, k_2) = -2r\cos\theta \\ f_2(k_1, k_2) = r^2 \end{cases} \quad \text{(Eq. 15)}$$

Substituting Eqs. 9a and 9b into Eq. 15 yields $$\begin{cases} f_1(k_1, k_2) = -2e^{-\frac{4}{T_i}}\cos\left(\pi\frac{\log r}{\log M_i}\right) \\ f_2(k_1, k_2) = e^{-\frac{2}{T_i}} \end{cases} \quad \text{(Eq. 16)}$$

Therefore, the solutions of Eq. 16 may essentially provide guidelines to design a suitable controller gain $K_i$ 78 such that the target settling time $T_i$ and maximum overshoot $M_i$ in RRA scheme may be met.

As shown in FIG. 6, the target system 80 may be achieved by feeding back proportional state variables 84 to the control input 82. The state variables 84 may represent the on-line traffic dynamics, which may imply changes of the queue length and bandwidth requirement of an LS. The controller 76 may essentially feedback the traffic dynamics information, after multiplying by the controller gain 78, to the input 82 of the system. By doing so, the eigenvalues of an open plant system, which is usually outside of the unit circle, may be driven back into the inside of the unit circle after implementing proper controller gains. In this manner, the system is driven into the stable state. An example controller 76 may be facilitated through the proper buffering and intra-LS scheduling schemes at the RS, or the appropriate inter-LS scheduling scheme among LSs. Thus, the RS may work as a central controller to tune LSs accordingly, which may ensure that the upstream resource of a P2MP system is fairly shared among multiple LSs. The controller gains $K_i|_{i=1,2,3,4,5,6}$ 78 describe the controller 76 characteristics in different scenarios.

For PRA, the RS may manipulate the upstream transmission from multiple LSs by using a controller $U_i(n) = -KX_i(n)$ 76, where $K = K_i|_{i=1-4}$ 78. The estimation index $\alpha_i$ may affect the system stability when designing a controller 76 for a P2MP system with PRA. In both RRA and PRA, the above equations may provide guidelines for the controller 76 design to achieve a P2MP system's stability.

Figure 7:
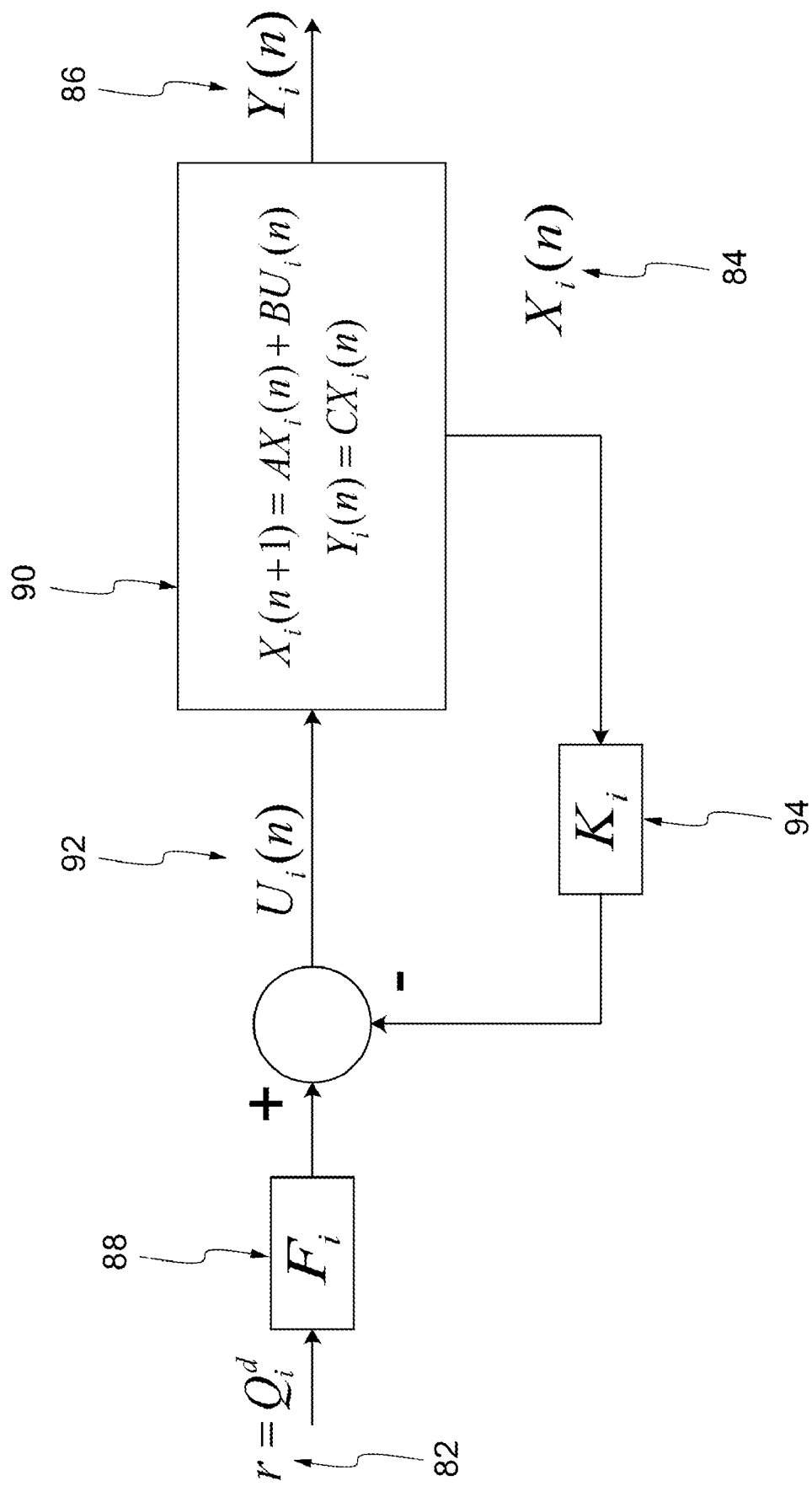
FIG. 7 is a schematic diagram of another example embodiment of an electrical control system.

Based at least in part on the models discussed above, example controller designs may now be determined. An example of one such controller design is depicted in FIG. 7. The present disclosure considers that design objectives typically may be an initial action in controller design. In this case, the design objectives for resource allocation in a P2MP system may be system robustness, accuracy, and target transient performance.

P2MP resource allocation schemes may achieve robustness performance regarding the system dynamics. Robustness implies that the system should be able to handle various conditions, even when online traffic changes dramatically.

An electrical control system is said to be "accurate" if the measured output converges or becomes sufficiently close to the reference input. In a P2MP system, the reference input r 82 may be chosen from various SLA parameters, or other pre-defined parameters. The measured output $Y_i(n)$ 86 is thus desired to converge to r 82 in order to ensure that control objectives are met. For example, the desired queue length $Q_i^d$ of $LS_i$ may be the reference input 82, e.g., $r=Q_i^d$. The desired queue length $Q_i^d$ is defined as the efficient queue length to achieve high network resource utilization. Theoretically, each LS may maintain a desired queue length $Q_i^d$ to avoid overflow or emptiness. If the queue length becomes too large, data loss and retransmission may occur due to limited available buffers. On the other hand, if the queued length becomes empty, it indicates that the allocated resource for this LS may be more than it actually needs. In that case, the network resource may be wasted with low utilization. Both of these extremes may be avoided by maintaining a desired queue length $Q_i^d$.

As discussed above, in a electrical control system, the settling time $T_i$ and the maximum overshoot $M_i$ may be two main parameters to prescribe the system's target transient performance. The settling time $T_i$ may be defined as the time for the P2MP system to reach the steady state. Short settling times may be utilized to achieve the performance objective, especially when incoming traffic of LSs have large volatility. On the other side, the maximum overshoot $M_i$ may be defined as the difference between the maximum system output $y_{max}$ and steady-state system output $y_{ss}$ divided by the steady-state system output $y_{ss}$, e.g., $$M_i = \frac{y_{max} - y_{ss}}{y_{ss}}.$$

The maximum overshoot may provide the upper bound for the output oscillations of a P2MP system.

In designing one embodiment, consider the measured system output $Y_i(n)=CX_i(n)$ 86, and define matrix $C=[0\ 1]$. The system output essentially may be the measurement to the report queue length $Q_i(n)$. The state space system may then be described as $$X_i(n+1)=AX_i(n)+BU_i(n)$$

$$Y_i(n)=CX_i(n) \quad \textbf{90} \quad \text{(Eq. 17)}$$

It may be useful to design a controller 92 to achieve the design objectives of robustness, accuracy and target transient performances. FIG. 7 illustrates such a controller 92 by implementing $$U_i(n)=-K_iX_i(n)+F_ir \quad \textbf{92} \quad \text{(Eq. 18)}$$

to achieve the prescribed objectives. The reference input r 82 is the desired queue length, and thus $e(n)=Y_i(n)-r$ is the control error. The matrix $F_i$ 88 is a compensator to offset the control error, so that the system output 86 can eventually converge to the input reference 82 (i.e., $e(n)=0$). Therefore, a suitable controller gain $K_i$ 94 and compensator $F_i$ 88 may be determined.

As discussed above, the objective of system accuracy relates to output $Y_i(n)$ 86, which is the output measurement of report queue length, converging to the system input r 82, the desired queue length. To reach this objective, a compensator $F_i$ 88 may be implemented after the reference 82, and may be added up to the feedback from the state variable 84, to form the controller $U_i(n)$ 92, which is illustrated in FIG. 7. Therefore, a compensator $F_i$ 88 may be designed in such way to offset the control error, e.g., $e(n)=0$.

For a particular P2MP system i, the compensator $F_i$ 88 may be determined by the state matrix $A_i$, the input matrix $B_i$, the output matrix $C_i$, and the controller gain $K_i$ 94. The present disclosure contemplates that the compensator $F_i$ 88 that drives the control error $e(n)=Y_i(n)-r$ to zero may be given by $$F_i = [K_i\ 1]\begin{bmatrix} A_i - I & B_i \\ C_i & 0 \end{bmatrix}^{-1}\begin{bmatrix} 0 \\ 1 \end{bmatrix} \quad \text{(Eq. 19)}$$

where $$\begin{bmatrix} A_i - I & B_i \\ C_i & 0 \end{bmatrix}$$

is a non-singular matrix.

Consequently, by implementing the compensator $F_i$ 88 of Eq. 19, the controller 92 may be able to force the system output $Y_i(n)$ 86 to track the reference input r 82, implying that the queue length can be eventually driven into the desired queue length $Q_i^d$.

Regarding the transient performance, recall that controller gain $K_i$ 94 in Eq. 18 may determine the poles in the closed loop characteristic polynomial $\det[zI-(A_i-B_iK_i)]$, and thus the target transient performance $T_i$ and $M_i$ may be achieved by properly tuning the controller gain $K_i$ 94. From the discussion above, in the RRA scheme, it can be shown that the equation $$\begin{cases} f_1(k_1, k_2) = -2e^{-\frac{4}{T_i}}\cos\left(\pi\frac{\log r}{\log M_i}\right) \\ f_2(k_1, k_2) = e^{-\frac{2}{T_i}} \end{cases}$$

provides a guideline to design a suitable controller gain $K_i$ 94 such that the target settling time $T_i$ and maximum overshoot $M_i$ may be met.

Figure 8:
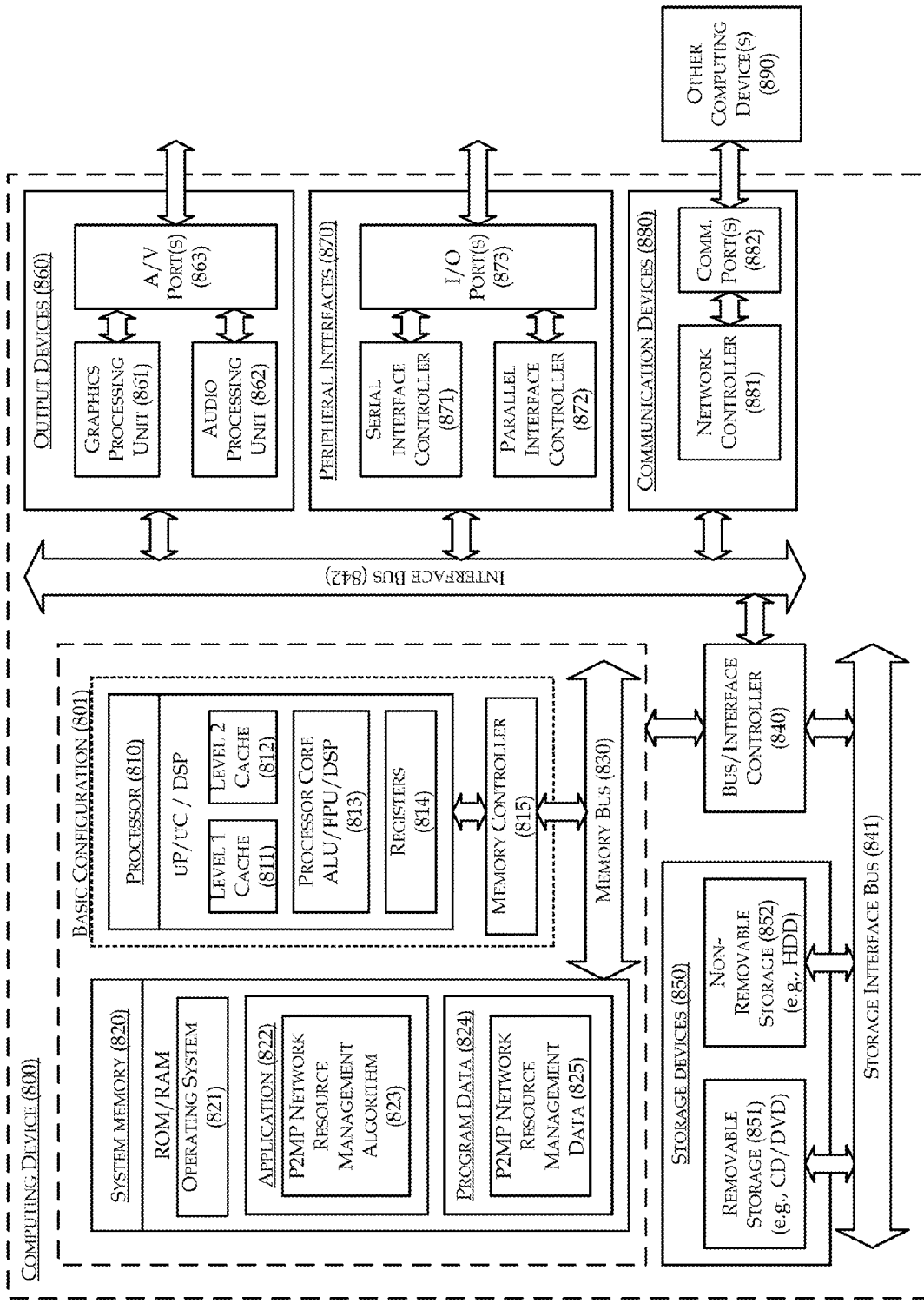
FIG. 8 is a schematic diagram of an example computing system, all arranged in accordance with the present disclosure.

With reference to FIG. 8, depicted is a block diagram illustrating an example computing device 800 that is arranged for point-to-multipoint (P2MP) network resource management in accordance with the present disclosure. In a very basic configuration 801, computing device 800 typically includes one or more processors 810 and system memory 820. A memory bus 830 can be used for communicating between the processor 810 and the system memory 820.

Depending on the desired configuration, processor 810 can be of any type including but not limited to a microprocessor (µP), a microcontroller (µC), a digital signal processor (DSP), or any combination thereof. Processor 810 can include one more levels of caching, such as a level one cache 811 and a level two cache 812, a processor core 813, and registers 814. The processor core 813 can include an arithmetic logic unit (ALU), a floating point unit (FPU), a digital signal processing core (DSP Core), or any combination thereof. A memory controller 815 can also be used with the processor 810, or in some implementations the memory controller 815 can be an internal part of the processor 810.

Depending on the desired configuration, the system memory 820 can be of any type including but not limited to volatile memory (such as RAM), non-volatile memory (such as ROM, flash memory, etc.) or any combination thereof. System memory 820 typically includes an operating system 821, one or more applications 822, and program data 824. Application 822 includes a point-to-multipoint network resource management algorithm 823 that is arranged to efficiently manage network resources in a point-to-multipoint network. Program Data 824 includes point-to-multipoint (P2MP) network resource management data 825. In some embodiments, application 822 can be arranged to operate with program data 824 on an operating system 821 to effectuate the efficient management of network resources. This described basic configuration is illustrated in FIG. 8 by those components within dashed line 801.

Computing device 800 can have additional features or functionality, and additional interfaces to facilitate communications between the basic configuration 801 and any required devices and interfaces. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media can be part of device 800.

Computing device 800 can also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which can be configured to communicate to various external devices such as a display or speakers via one or more A/V ports 863. Example peripheral interfaces 870 include a serial interface controller 871 or a parallel interface controller 872, which can be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which can be arranged to facilitate communications with one or more other computing devices 890 over a network communication via one or more communication ports 882. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 800 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 can also be implemented as a personal computer including both laptop computer and non-laptop computer configurations.

According to one embodiment, computing device 800 is coupled to a networking environment such that the processor 810, application 822 and/or program data 824 can perform with or as a point-to-multipoint (P2MP) network resource management system in accordance with embodiments herein. For example, the diagrams shown in FIGS. 2-4 may be implemented in such environment.

It should also be understood that, while a stated objective of various example embodiments disclosed herein may be to "minimize" the settling time or other parameters or characteristics, it is not necessary to literally minimize any parameters or other characteristic to fall within the scope of any claim unless such specific objective is expressly claimed. Likewise, it should be understood that it is not necessary to literally "optimize" the settling time or other parameters or characteristics to fall within the scope of any claim unless such specific objective is expressly claimed.

The herein described subject matter sometimes illustrates different components contained within, or coupled with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for an electrical control system to manage resources in a point-to-multipoint (P2MP) network that includes at least one root station and at least one leaf station each configured to transmit and receive one or more network packets over the P2MP network, the method for the electrical control system comprising:
    controlling the at least one root station based, at least in part, on output of the electrical control system, wherein the electrical control system is configured to reduce an amount of time for the electrical control system to produce an output comprising a steady state and to define a maximum boundary for the output, the electrical control system comprising a feedback control loop;
    transmitting one or more network packets to the at least one leaf station, wherein the at least one leaf station is capable of transmitting and receiving the one or more network packets from the at least one root station, and wherein the at least one leaf station is capable of communication with the at least one root station; and
    repeating the controlling and the transmitting for at least one of the one or more network packet; and
    wherein the electrical control system is based at least in part on the equation $x_i(n+1)=(A_i-B_iK_i)x_i(n)$, where $x_i(n)$ is a state vector that indicates a bandwidth requirement and queue length of the at least one leaf station, where $A_i$ is a state vector matrix, $B_i$ is an input vector matrix, where $K_i$ is a constant matrix, and where n is a given time.

2. The method of claim 1, wherein the at least one leaf station is prohibited from communicating with at least a portion of the other leaf stations.

3. The method of claim 1, wherein the controlling further comprises:
    analyzing the output to determine if the output is equal to a desired output;
    if the output is not equal to the desired output, adjusting the output by a controller gain to produce a new output; and
    repeating the analyzing and the adjusting until the new output is equal to the desired output.

4. The method of claim 3, wherein the controller gain is $K_i$, a constant matrix.

5. The method of claim 4, wherein $K_i$ is defined by the equation $$\begin{cases} f_1(k_{11}, k_{12}, k_{21}, k_{22}, \alpha_i) = -2e^{-\frac{4}{T_i}}\cos\left(\pi\frac{\log r}{\log M_i}\right) \\ f_2(k_{11}, k_{12}, k_{21}, k_{22}, \alpha_i) = e^{-\frac{2}{T_i}} \end{cases},$$

where $k_{11}, k_{12}, k_{21}$ and $k_{22}$ are vectors of $K_i$, $\alpha_i$ is an estimate index, r is a reference input, $T_i$ is the amount of time for the electrical control system to produce an output comprising a steady state, and $M_i$ is the maximum boundary for the output.

6. The method of claim 4, wherein $K_i$ is defined by the equation $$\begin{cases} f_1(k_1, k_2) = -2e^{-\frac{4}{T_i}}\cos\left(\pi\frac{\log r}{\log M_i}\right) \\ f_2(k_1, k_2) = e^{-\frac{2}{T_i}} \end{cases},$$

where $k_1$ and $k_2$ are vectors of $K_i$, r is a reference input, $T_i$ is the amount of time for the electrical control system to produce an output comprising a steady state, and $M_i$ is the maximum boundary for the output.

7. The method of claim 1, wherein the electrical control system comprises a controller based at least in part on the equation $U_i(n)=-KX_i(n)$, where $K=K_i|_{i=1\sim 4}$, and where $X_i(n)$ is a state vector that indicates a bandwidth requirement and a queue length of the at least one leaf station.

8. A system for an electrical control system to manage resources in a point-to-multipoint (P2MP) network that includes at least one root station and at least one leaf station that are configured to transmit and receive one or more network packets over the P2MP network, the system for the electrical control system comprising:

a compensator operably coupled to a reference input, the compensator configured to offset a control error, the control error being a difference between the reference input and an output signal;

a comparator operably coupled to the compensator, the comparator configured to calculate the control error;

a controller configured to output the output signal and further configured to manipulate the output signal if the control error is determined to be a non-zero value; and a controller gain operably coupled to the controller and the comparator, the controller gain being multiplied by the output signal;

wherein the controller may adjust the controller gain to manipulate the output signal such that specific characteristics of the output signal may be attained; and wherein the electrical control system is based at least in part on the equation $x_i(n+1)=(A_i-B_iK_i)x_i(n)$, where $x_i(n)$ is a state vector that indicates a bandwidth requirement and queue length of the at least one leaf station, where $A_i$ is a state vector matrix, $B_i$ is an input vector matrix, where $K_i$ is a constant matrix, and where n is a given time.

9. The system of claim 8, wherein the at least one leaf station is prohibited from communicating with the other leaf stations.

10. The system of claim 8, wherein the controller gain is $K_i$, a constant matrix.

11. The system of claim 10, wherein $K_i$ is defined by the equation $$\begin{cases} f_1(k_{11}, k_{12}, k_{21}, k_{22}, \alpha_i) = -2e^{-\frac{4}{T_i}}\cos\left(\pi\frac{\log r}{\log M_i}\right) \\ f_2(k_{11}, k_{12}, k_{21}, k_{22}, \alpha_i) = e^{-\frac{2}{T_i}} \end{cases},$$

where $k_{11}, k_{12}, k_{21}$ and $k_{22}$ are vectors of $K_i$, $\alpha_i$ is an estimate index, r is the reference input, $T_i$ is an amount of time for the resource management component to produce the output signal comprising a steady state, and $M_i$ is a maximum boundary for the output signal.

12. The system of claim 10, wherein $K_i$ is defined by the equation $$\begin{cases} f_1(k_1, k_2) = -2e^{-\frac{4}{T_i}}\cos\left(\pi\frac{\log r}{\log M_i}\right) \\ f_2(k_1, k_2) = e^{-\frac{2}{T_i}} \end{cases},$$

where $k_1$ and $k_2$ are vectors of $K_i$, r is the reference input, $T_i$ is an amount of time for the resource management component to produce the output signal comprising a steady state, and $M_i$ is a maximum boundary for the output signal.

13. The system of claim 8, wherein the controller is based at least in part on the equation $U_i(n)=-KX_i(n)$, where $K=K_i|_{i=1\sim 4}$, and where $X_i(n)$ is a state vector that indicates a bandwidth requirement and a queue length of the at least one leaf station.

14. A method for an electrical control system to manage resources in a point-to-multipoint (P2MP) network that includes at least one root station and at least one leaf station that are configured to transmit and receive one or more network packets over the P2MP network, the method for the electrical control system comprising:

configuring a control for the electrical control system based at least in part on the equation $U_i(n)=-KX_i(n)$, where $K=K_i|_{i=1\sim 4}$, and where $X_i(n)$ is a state vector that indicates a bandwidth requirement and a queue length of the at least one leaf station, wherein the electrical control system includes a variable gain for an output, wherein the output has a steady state and a defined maximum boundary;

repeatedly analyzing the output of the electrical control system to determine if the output is equal to a desired output;

dynamically adjusting the output of the electrical control system to provide a new output by changing a variable gain until the new output achieves the desired output; and transmitting one or more network packets to one or more of the at least one leaf station and at least one root station based at least in part on the output of the electrical control system;

wherein the variable gain is $K_i$, a constant matrix and is defined by the equation $$\begin{cases} f_1(k_{11}, k_{12}, k_{21}, k_{22}, \alpha_i) = -2e^{-\frac{4}{T_i}}\cos\left(\pi\frac{\log r}{\log M_i}\right) \\ f_2(k_{11}, k_{12}, k_{21}, k_{22}, \alpha_i) = e^{-\frac{2}{T_i}} \end{cases},$$

where $k_{11}, k_{12}, k_{21}$ and $k_{22}$ are vectors of $K_i$, $\alpha_i$ is an estimate index, r is a reference input, $T_i$ is the amount of time for the electrical control system to produce an output comprising a steady state, and $M_i$ is the maximum boundary for the output.

15. The method of claim 14, wherein the electrical control system implements a prediction-based resource allocation (PRA) scheme.

16. A method for an electrical control system to manage resources in a point-to-multipoint (P2MP) network that includes at least one root station and at least one leaf station that are configured to transmit and receive one or more network packets over the P2MP network, the method for the electrical control system comprising:

configuring a control for the electrical control system based at least in part on the equation $U_i(n)=-KX_i(n)$, where $K=K_i|_{i=1\sim 4}$, and where $X_i(n)$ is a state vector that indicates a bandwidth requirement and a queue length of the at least one leaf station, wherein the electrical control system includes a variable gain for an output, wherein the output has a steady state and a defined maximum boundary;

repeatedly analyzing the output of the electrical control system to determine if the output is equal to a desired output;

dynamically adjusting the output of the electrical control system to provide a new output by changing a variable gain until the new output achieves the desired output; and transmitting one or more network packets to one or more of the at least one leaf station and at least one root station based at least in part on the output of the electrical control system;

wherein the variable gain is $K_i$, a constant matrix and is defined by the equation $$\begin{cases} f_1(k_1, k_2) = -2e^{-\frac{4}{T_i}}\cos\left(\pi\frac{\log r}{\log M_i}\right) \\ f_2(k_1, k_2) = e^{-\frac{2}{T_i}} \end{cases},$$

where $k_1$ and $k_2$ are vectors of $K_i$, r is a reference input, $T_i$ is the amount of time for the electrical control system to produce an output comprising a steady state, and $M_i$ is the maximum boundary for the output.

17. The method of claim 16, wherein the electrical control system implements a request-based resource allocation (RRA) scheme.

18. A method for an electrical control system to manage resources in a point-to-multipoint (P2MP) network that includes at least one root station and at least one leaf station configured to transmit and receive one or more network packets over the P2MP network, the method for the electrical control system comprising:

controlling the at least one root station based, at least in part, on output of the electrical control system, wherein the electrical control system is configured to reduce an amount of time for the electrical control system to produce an output comprising a steady state and to define a maximum boundary for the output, the electrical control system comprising a feedback control loop;

transmitting one or more network packets to the at least one leaf station, wherein the at least one leaf station is capable of transmitting and receiving the one or more network packets from the at least one root station, and wherein the at least one leaf station is capable of communication with the at least one root station; and repeating the controlling and the transmitting for at least one of the one or more network packet; and wherein the electrical control system comprises a controller based at least in part on the equation $U_i(n)=-KX_i(n)$, where $K=K_i|_{i=1\sim4}$, and where $X_i(n)$ is a state vector that indicates a bandwidth requirement and a queue length of the at least one leaf station.

19. The method of claim 18, wherein the at least one leaf station is prohibited from communicating with at least a portion of the other leaf stations.

20. The method of claim 18, wherein the controlling further comprises:

analyzing the output to determine if the output is equal to a desired output;

if the output is not equal to the desired output, adjusting the output by a controller gain to produce a new output; and repeating the analyzing and the adjusting until the new output is equal to the desired output.

* * * * *

UNITED STATES PATENT AND TRADEMARK OFFICE
CERTIFICATE OF CORRECTION

PATENT NO. : 8,184,627 B2
APPLICATION NO. : 12/396039
DATED : May 22, 2012
INVENTOR(S) : Ansari et al.

It is certified that error appears in the above-identified patent and that said Letters Patent is hereby corrected as shown below:

On the Title Page, in Item (56), under "OTHER PUBLICATIONS", in Column 2, Line 3, delete "al," and insert -- al., --, therefor.

On Title Page 2, in Item (56), under "OTHER PUBLICATIONS", in Column 1, Line 1, delete "al," and insert -- al., --, therefor.

On Title Page 2, in Item (56), under "OTHER PUBLICATIONS", in Column 1,
Lines 38-39, delete "http:wwwieee802" and insert -- http://www.ieee802 --, therefor.

On Title Page 2, in Item (56), under "OTHER PUBLICATIONS", in Column 1, Line 51, delete "(WDM-POM)" and insert -- (WDM-PON) --, therefor.

In the Drawings

In the drawings, Fig. 3 & 4, should be replaced with the corrected Fig. 3 & 4, as shown on the attached page.

In Fig. 3, Drawing Sheet 3 of 8, for Tag "42", in Line 1, delete "$K_i^r$" and insert -- $K_{j}^r$ --, therefor.

In Fig. 3, Drawing Sheet 3 of 8, for Tag "42", in Line 4, delete "$f_2(k_{1,1}$," and insert -- $f_2(k_{11}$, --, therefor.

In Fig. 3, Drawing Sheet 3 of 8, for Tag "42", in Line 5, delete "$\alpha_i$ is" and insert -- $\alpha_i$ is --, therefor.

In Fig. 3, Drawing Sheet 3 of 8, for Tag "42", in Line 6, delete "$T_i$" and insert -- $T_i$ --, therefor.

Signed and Sealed this
Twentieth Day of August, 2013

Teresa Stanek Rea
*Acting Director of the United States Patent and Trademark Office*

In Fig. 3, Drawing Sheet 3 of 8, for Tag "42", in Line 7, delete "$M_i$" and insert -- $M_i$ --, therefor.

In Fig. 4, Drawing Sheet 4 of 8, for Tag "52", in Line 1, delete "$K_i^r$" and insert -- $K_i^r$ --, therefor.

In Fig. 4, Drawing Sheet 4 of 8, for Tag "52", in Line 4, delete "$f_2,(k_1,$" and insert -- $f_2$ ($k_1$, --, therefor.

In Fig. 4, Drawing Sheet 4 of 8, for Tag "52", in Line 5, delete "$k_1$" and insert -- $k_1$ --, therefor.

In Fig. 4, Drawing Sheet 4 of 8, for Tag "52", in Line 5, delete "$K_i^r$" and insert -- $K_i^r$ --, therefor.

In the Specification

In Column 5, Line 59, in (Eq. 2b), delete "$Q_i(n)$," and insert -- $Q_i(n)$. --, therefor.

In Column 8, Line 18, delete "a," and insert -- $\alpha_i$ --, therefor.

In Column 9, Line 35, delete "a electrical" and insert -- an electrical --, therefor.

adapting a control for an electrical control system based at least in part on the equation,
$$U_i(n) = -KX_i(n)$$
where $K = K_i|_{i=1...4}$, and where $X_i(n)$ is a state vector that indicates a bandwidth requirement and a queue length of at least one leaf station, wherein the electrical control system includes a variable gain for an output, wherein the output has a steady state and a defined maximum boundary ← 34 repeatedly analyzing the output of the electrical control system to determine if the output is equal to a desired output ← 36 dynamically adjusting the output of the electrical control system to provide a new output by changing a variable gain until the new output achieves the desired output ← 38 transmitting one or more network packets to one or more of the at least one leaf station and at least one root station based at least in part on the output of the electrical control system ← 40 wherein the variable gain is $K_i$, a constant matrix and is defined by the equation
$$\begin{cases} f_1(k_{11}, k_{12}, k_{21}, k_{22}, \alpha_i) = -2e^{-4/T_i} \cos(\pi \frac{\log r}{\log M_i}) \\ f_2(k_{11}, k_{12}, k_{21}, k_{22}, \alpha_i) = e^{-2/T_i} \end{cases}$$
where $k_{11}, k_{12}, k_{21}$ and $k_{22}$ are vectors of $K_i$, $\alpha_i$ is an estimate index, $r$ is a reference input, $T_i$ is the amount of time for the electrical control system to produce an output comprising a steady state, and $M_i$ is the maximum boundary for the output ← 42

FIG. 3 adapting a control for an electrical control system based at least in part on the equation,
$$U_i(n) = -KX_i(n)$$
where $K = K_i|_{i=1-1}$, and where $X_i(n)$ is a state vector that indicates a bandwidth requirement and a queue length of at least one leaf station, wherein the electrical control system includes a variable gain for an output, wherein the output has a steady state and a defined maximum boundary ← 44 repeatedly analyzing the output of the electrical control system to determine if the output is equal to a desired output ← 46 dynamically adjusting the output of the electrical control system to provide a new output by changing a variable gain until the new output achieves the desired output ← 48 transmitting one or more network packets to one or more of the at least one leaf station and at least one root station based at least in part on the output of the electrical control system ← 50 wherein the variable gain is $K_i$, a constant matrix and is defined by the equation
$$\begin{cases} f_1(k_1, k_2) = -2e^{-4/T_i} \cos(\pi \frac{\log r}{\log M_i}) \\ f_2(k_1, k_2) = e^{-2/T_i} \end{cases}$$
where $k_1$ and $k_2$ are vectors of $K_i$, $r$ is a reference input, $T_i$ is the amount of time for the electrical control system to produce an output comprising a steady state, and $M_i$ is the maximum boundary for the output. ← 52

FIG. 4